(12) United States Patent
Lundquist et al.

(10) Patent No.: US 7,691,923 B2
(45) Date of Patent: Apr. 6, 2010

(54) CURABLE AND CURED WOOD PARTICLE COMPOSITES AND METHOD OF MAKING SAME

(75) Inventors: Eric Gustave Lundquist, North Wales, PA (US); Allen Philip Marks, Richboro, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 12/150,844

(22) Filed: May 1, 2008

(65) Prior Publication Data

US 2008/0287572 A1  Nov. 20, 2008

Related U.S. Application Data

(60) Provisional application No. 60/930,158, filed on May 14, 2007.

(51) Int. Cl.
  *C08K 3/00* (2006.01)
  *B32B 7/12* (2006.01)
(52) U.S. Cl. .......................................... 524/13; 156/327
(58) Field of Classification Search .................. 524/13; 156/327
  See application file for complete search history.

(56) References Cited

U.S. PATENT DOCUMENTS

| 5,084,536 | A | 1/1992 | Brindopke et al. |
| 2005/0081994 | A1 | 4/2005 | Beckley et al. |
| 2005/0245636 | A1 | 11/2005 | Fechter et al. |
| 2005/0245721 | A1 | 11/2005 | Beckley et al. |
| 2006/0247374 | A1 * | 11/2006 | Beckley et al. ............. 525/54.2 |

FOREIGN PATENT DOCUMENTS

| EP | 1 593727 A1 | 11/2005 |
| GB | 2335424 A | 9/1999 |

OTHER PUBLICATIONS

Development and characterization of adhesives from soy protein for bonding wood. Liu et al. Int J Adhes Adhesives 27:59-67. Feb. 21, 2006.*

* cited by examiner

*Primary Examiner*—Marc S Zimmer
*Assistant Examiner*—John Uselding
(74) *Attorney, Agent, or Firm*—Cantor Colburn LLP

(57) ABSTRACT

Curable wood particle composites curable by the Michael addition reaction in the presence of strong base catalyst are disclosed, along with a method for making those curable wood particle composites. Cured wood particle composites are also disclosed, along with a method of making those cured wood particle composites.

12 Claims, No Drawings

CURABLE AND CURED WOOD PARTICLE COMPOSITES AND METHOD OF MAKING SAME

This application claims the benefit of priority under 35 U.S.C. §119(e) of U.S. Provisional Patent Application No. 60/930,158 filed on May 14, 2007.

The present invention pertains to a method of using a functional component for forming a curable wood particle composite and further curing the curable wood particle composite to form a cured wood particle composite, and to the curable wood particle composite and the cured wood particle composite so formed.

Many compositions that are useful for forming wood particle composites undergo a curing step during formation of that wood particle composite. That is, they undergo useful chemical reactions that increase molecular weight. Curing reactions typically have one or more of the following functions: polymerization, branching of polymers, crosslinking of polymers, and formation of crosslinked networks. Polymerization reactions currently employed in the formation of commercial wood particle composites tend to be particularly hazardous, with melamine-formaldehyde polymerizations being among those approaches exhibiting potential for environmental hazard during and after formation of the wood particle composite. One chemical reaction potentially useful as a curing reaction is Michael addition. For example, U.S. Pat. No. 5,084,536 discloses the use of Michael addition in the formation of a cured lacquer, which is a type of coating. However, it is desired to form wood particle composites the cure reactions of which include Michael addition. US2005/0081994 A1 discloses the use of Michael addition, catalyzed by strong base, in the coating of a layer of wood to provide a curable adhesive surface to which another layer of wood can be laminated. The strong base catalyzed Michael reaction is typically facile at or near room temperature, making its use attractive for application to, and bonding of, adjacent layers of wood at room temperature and pressure. Acceleration of reaction through the application of heat and pressure is not required. While such systems find utility for lamination of layers of wood under ambient conditions, the relatively extreme conditions utilized to form and shape wood particle composites from wood particles generally preclude the use of a strong base catalyst. In such strong base catalyzed systems, the combination of heat and pressure used to compress and physically entangle or otherwise enmesh populations of wood particles into a desired shape, having a desired density, accelerates the Michael addition such that the Michael polymerization occurs before the desired compaction with concomitant densification is effected. Beyond causing premature formation of Michael polymer, the elevated heat and pressure can also foster formation increased levels of undesired by-produces due to side-reactions of the strong base with other Michael reactants.

We have, surprisingly, discovered that two or more Michael functional components including one or two types of Michael ingredient selected from: a multi-functional Michael donor, a multi-functional Michael acceptor, and a strong base catalyst, when combined with plural wood particles, form a reactive wood particle blend containing a Michael reaction mixture that is stable for hours or days at room temperature, that can be shaped into a curable wood particle composite, and that is readily reactive at practical curing temperatures and pressures to form cured wood particle composites having useful performance properties.

One aspect of the present invention is directed to a method comprising the steps of:

(a) providing at least one population of plural untreated wood particles;
(b) providing at least two Michael functional components;
(c) contacting a population of the plural untreated wood particles with a Michael functional component to form plural Michael reactive wood particles;
(d) optionally, contacting a population of the plural Michael reactive wood particles with a Michael functional component;
(e) blending any remaining plural untreated wood particles and any of the plural Michael reactive wood particles to form a reactive wood particle blend; and
(f) shaping the reactive wood particle blend to form a curable wood particle composite, wherein:
the step of contacting occurs: before the step of blending; during the step of blending; or both before and during the step of blending;
each Michael functional component comprises one or two types of Michael ingredient selected from:
(i) a multi-functional Michael donor;
(ii) a multi-functional Michael acceptor; and
(iii) a strong base catalyst having a conjugate acid which has a $pK_a$ of greater than 12.5; and
the Michael functional components, taken together, comprise:
at least one of the multi-functional Michael donor;
at least one of the multi-functional Michael acceptor; and
at least one of the strong base catalyst.

A second aspect of the present invention is directed to a curable wood particle composite comprising:
(a) at least one population of plural Michael reactive wood particles; and
(b) at least two Michael functional components,
wherein:
each Michael functional component comprises one or two types of Michael ingredient selected from:
(i) a multi-functional Michael donor;
(ii) a multi-functional Michael acceptor; and
(iii) a strong base catalyst having a conjugate acid which has a $pK_a$ of greater than 12.5; and
the Michael functional components, taken together, comprise:
at least one of the multi-functional Michael donor;
at least one of the multi-functional Michael acceptor; and
at least one of the strong base catalyst.

A third aspect of the present invention is directed to a cured wood particle composite comprising:
(a) at least one population of plural wood particles; and
(b) a Michael polymer comprising plural Michael linkages, wherein the Michael linkages are formed by the reaction of a multi-functional Michael donor with a multi-functional Michael acceptor in the presence of a strong base catalyst having a conjugate acid which has a $pK_a$ of greater than 12.5.

Used herein, the following terms have these definitions:

The words "a" and "an" as used in the specification mean "at least one", unless otherwise specifically stated.

"Range". Disclosures of ranges herein take the form of lower and upper limits. There may be one or more lower limits and, independently, one or more upper limits. A given range is defined by selecting one lower limit and one upper limit. The selected lower and upper limits then define the boundaries of that particular range. All ranges that can be defined in this way are inclusive and combinable, meaning that any lower limit may be combined with any upper limit to delineate a range. For example, if ranges of 60 to 120 and 80 to 110 are recited for a particular parameter, it is understood that the ranges of 60 to 110 and 80 to 120 are also contemplated. Additionally, if minimum range values of 1 and 2 are recited, and if maximum range values of 3, 4, and 5 are recited, then the following ranges are all contemplated: 1 to 3, 1 to 4, 1 to 5, 2 to 3, 2 to 4, and 2 to 5.

It will be appreciated by those skilled in the art that changes could be made to the suitable methods and compositions specifically described herein without departing from the broad inventive concept thereof. It is understood, therefore, that this invention is not limited to the particular suitable methods and compositions disclosed, and that recitation thereof is intended to additionally cover modifications within the spirit and scope of the present invention as defined by the appended claims.

As used herein, "(meth)acrylate" means acrylate or methacrylate, and "(meth)acrylic" means acrylic or methacrylic.

The present invention involves the use of compounds with functional groups capable of undergoing a Michael addition reaction. Michael addition is taught, for example, by R. T. Morrison and R. N. Boyd in *Organic Chemistry*, third edition, Allyn and Bacon, 1973. The reaction is believed to take place between a Michael donor and a Michael acceptor, in the presence of a base catalyst.

A "Michael donor," as used herein, is a compound with at least one "Michael donor functional group", which is a functional group containing at least one "Michael active hydrogen atom" ("Michael active hydrogen"), which is a hydrogen atom attached to a carbon atom that is located between two electron-withdrawing groups such as $C=O$ and/or $C\equiv N$. Examples of Michael donor functional groups are malonate esters, acetoacetate esters, malonamides, and acetoacetamides (in which the Michael active hydrogens are attached to the carbon atom between two carbonyl groups); and cyanoacetate esters and cyanoacetamides (in which the Michael active hydrogens are attached to the carbon atom between the carbonyl group and the cyano group). A compound with two or more Michael active hydrogen atoms is known herein as a "multi-functional Michael donor". A "Michael donor" may have one, two, three, or more separate functional groups that each contains one or more Michael active hydrogen atoms. The total number of Michael active hydrogen atoms on the molecule is the "functionality of the Michael donor" ("Michael donor functionality"). As used herein, the "skeleton" of the Michael donor is the portion of the donor molecule other than the functional group containing the Michael active hydrogen atom(s).

A "Michael acceptor," as used herein, is a compound with at least one functional group with the structure (I) $R^1R^2C=C-C(O)R^3$, where $R^1$, $R^2$, and $R^3$ are, independently, hydrogen or organic radicals such as for example, alkyl (linear, branched, or cyclic), aryl, alkaryl, including derivatives and substituted versions thereof. $R^1$, $R^2$, and $R^3$ may or may not, independently, contain ether linkages, carboxyl groups, further carbonyl groups, thio analogs thereof, nitrogen containing groups, or combinations thereof. A compound with two or more functional groups, each containing structure (I), is known herein as a "multi-functional Michael acceptor". The number of functional groups containing structure (I) on the molecule is the "functionality of the Michael acceptor" ("Michael acceptor functionality"). As used herein, the "skeleton" of the Michael acceptor is the portion of the donor molecule other than structure (I). Any structure (I) may be attached to another (I) group or to the skeleton directly.

A "Michael polymer" of the present invention is a polymer formed when a multi-functional Michael donor reacts with a multi-functional Michael acceptor in the presence of strong base catalyst to form one or more "Michael linkages".

In the practice of the present invention, the skeleton of the multi-functional Michael acceptor may be the same or different from the skeleton of the multi-functional Michael donor. One or more polyhydric alcohol may be used as at least one suitable skeleton. Some polyhydric alcohols suitable as skeletons for either the multi-functional Michael acceptor or the multi-functional Michael donor include, for example, alkane diols, alkylene glycols, glycerols, sugars, pentaerythritols, polyhydric derivatives thereof, or mixtures thereof. Some polyhydric alcohols suitable as skeletons include, for example, cyclohexane dimethanol, hexane diol, castor oil, trimethylol propane, glycerol, ethylene glycol, propylene glycol, pentaerythritol, similar polyhydric alcohols, substituted versions thereof, and mixtures thereof.

Further examples of polyhydric alcohols suitable as skeletons in the present invention include, for example, polyhydric alcohols with molecular weight of 150 or greater (in addition to those named herein above). One suitable polyhydric alcohol with molecular weight of 150 or greater is 4,8-bis(hydroxymethyl)tricyclo[$5.2.1.0^{2,6}$]decane, Chemical Abstracts Service (CAS) registry number 26896-48-0; any isomers or mixtures thereof are suitable. Another suitable polyhydric alcohol with molecular weight of 150 or greater is Polysorbate 80, CAS registry number 9005-65-6. Additionally, a wide variety of fatty acids and related oils are either polyhydric alcohols or may be hydroxylated by a variety of methods to form polyhydric alcohols; such polyhydric alcohols are also suitable. Some examples of fatty acids and related oils suitable as skeletons in the present invention are castor oil, hydroxylated fats and oils, hydroxylated derivatives of fats and oils, and mixtures thereof. Polyhydric alcohols similar to those named above are also suitable as skeletons. Also, mixtures of suitable polyhydric alcohols are suitable.

Suitable skeletons of the multi-functional Michael donor or the multi-functional Michael acceptor or both may include an oligomer or a polymer. A polymer, as used herein and as defined by F W Billmeyer, J R. in *Textbook of Polymer Science*, second edition, 1971 ("Billmeyer") is a relatively large molecule made up of the reaction products of smaller chemical repeat units. Normally, polymers have 11 or more repeat units. Polymers may have structures that are linear, branched, star shaped, looped, hyperbranched, or crosslinked. Polymers may have a single type of repeat unit ("homopolymers") or they may have more than one type of repeat unit ("copolymers"). As used herein, "resin" is synonymous with polymer.

Polymers have relatively high molecular weights. Polymer molecular weights can be measured by standard methods (see Gel Permeation Chromatography infra). Generally, polymers have weight-average molecular weight (Mw) of 1,000 or more. Polymers may have extremely high Mw; some polymers have Mw above 1,000,000; typical polymers have Mw of 1,000,000 or less.

"Oligomers," as used herein, are structures similar to polymers except that oligomers have fewer repeat units and lower molecular weight. Normally, oligomers have 2 to 10 repeat units. Generally, oligomers have Mw of 400 to 1,000.

A "Michael ingredient" is an ingredient that is capable of participating as reactant or catalyst in a "Michael reaction". The Michael ingredient of the present invention is selected from these three types of ingredient: multi-functional Michael donor, multi-functional Michael acceptor, and strong base catalyst. A "Michael reaction mixture" of the present invention is a reaction mixture including: at least one multi-functional Michael donor, at least one multi-functional Michael acceptor, and at least one strong base catalyst. Of course, a Michael reaction mixture may also, optionally, include a mono-functional Michael donor and/or a mono-functional Michael acceptor.

A "functional component" includes either one or two of the three types of Michael ingredient (i.e., multi-functional Michael donor, multi-functional Michael acceptor, and strong base catalyst). It is understood that the mixing of all three types of Michael ingredient to form a single functional component leads to premature Carbon-Michael ("Michael" herein) reactions due to the high activity of the strong base catalyst. Therefore, the Michael reaction mixture of the present invention may be formed from two or more functional components, provided that each functional component includes at least one type of Michael ingredient and that the combination of functional components contributes at least one multi-functional Michael donor, at least one multi-functional Michael acceptor, and at least one strong base catalyst to the resultant Michael reaction mixture, and hence to the curable wood particle composite that includes that Michael reaction mixture. For example, a suitable Michael reaction mixture can be formed by combining: a functional component including a multifunctional Michael donor; another functional component including a Michael acceptor; and yet another functional component including a strong base catalyst. In another example, one functional component includes both a multi-functional Michael donor and a multi-functional Michael acceptor, while another functional component includes a strong base catalyst. Alternatively, a functional component including a multifunctional Michael donor and a strong base catalyst is combined with another functional component including a multi-functional Michael acceptor to form a Michael reaction mixture in a reactive wood particle blend, with the proviso that the combination of that Michael donor and that strong base catalyst does not result in substantial side reactions prior to the curing step. In yet another suitable alternative, a functional component including a multifunctional Michael donor is combined with another functional component including a multi-functional Michael acceptor and a strong base catalyst to form a Michael reaction mixture in a reactive wood particle blend, with the proviso that the combination of that Michael acceptor and that strong base catalyst does not result in substantial side reactions prior to the curing step.

The practitioner will recognize that one or more multi-functional Michael donor, one or more multi-functional Michael acceptor, and one or more strong base catalyst may be usefully employed in the method of preparing a Michael reaction mixture, and hence the curable and cured wood particle composites of the present invention. The practitioner will further recognize that suitable multi-functional Michael donors and acceptors may independently be discrete molecules having a single structure and a single molecular weight or, as is the case with many oligomers and polymers, may independently include a distribution of large molecules (i.e., oligomeric or polymeric chains) having a variety of molecular weights.

Molecular Weight. Synthetic polymers are almost always a mixture of chains varying in molecular weight, i.e., there is a "molecular weight distribution", abbreviated "MWD". For a homopolymer, members of the distribution differ in the number of monomer units which they contain. This way of describing a distribution of polymer chains also extends to copolymers. Given that there is a distribution of molecular weights, the most complete characterization of the molecular weight of a given sample is the determination of the entire molecular weight distribution. This characterization is obtained by separating the members of the distribution and then quantifying the amount of each that is present. Once this distribution is in hand, there are several summary statistics, or moments, which can be generated from it to characterize the molecular weight of the polymer.

The two most common moments of the distribution are the "weight average molecular weight", "$M_w$", and the "number average molecular weight", "$M_n$". These are defined as follows:

$$M_w = \Sigma(W_i M_i)/\Sigma W_i = \Sigma(N_i M_i^2)/\Sigma N_i M_i$$

$$M_n = \Sigma W_i/\Sigma(W_i/M_i) = \Sigma(N_i M_i)/\Sigma N_i$$

wherein:
$M_i$=molar mass of $i^{th}$ component of distribution
$W_i$=weight of $i^{th}$ component of distribution
$N_i$=number of chains of $i^{th}$ component and the summations are over all the components in the distribution. $M_w$ and $M_n$ are typically computed from the MWD as measured by Gel Permeation Chromatography (see the Experimental Section).

Suitable multi-functional Michael donors of the present invention have a weight average molecular weight, $M_w$, of: at least 66, at least 100, or at least 150 g/mole; and no more than 2,000, no more than 1,000, no more than 400, or no more than 200 g/mole. Suitable multi-functional Michael donors may further include skeletons that are higher polymers such that these Michael donors have an $M_w$ of: greater than 2,000, at least 5,000, or at least 10,000 g/mole; and no more than 1,000,000, no more than 100,000, no more than 50,000, or no more than 20,000 g/mole.

Suitable multi-functional Michael acceptors of the present invention have a weight average molecular weight, Mw, of: at least 82, at least 110, at least 120, or at least 150 g/mole; and no more than 2,000, no more than 1,000, no more than 400, or no more than 200 g/mole. Suitable multi-functional Michael acceptors may further include skeletons that are higher polymers such that these Michael acceptors have an $M_w$ of: greater than 2,000, at least 5,000, or at least 10,000 g/mole; and no more than 1,000,000, no more than 100,000, no more than 50,000, or no more than 20,000 g/mole.

Without wishing to be bound by any particular theory, it is believed that particularly desirable performance properties can be realized for suitable cured wood particle composites if the crosslinks formed by reactions between multi-functional Michael donors and acceptors are well distributed throughout that cured wood particle composite. It is thought that, to achieve such distribution of crosslinks, the multi-functional Michael donor and the multi-functional Michael acceptor may advantageously become well distributed throughout the curable wood particle composite at some point during the preparation and curing of the curable wood particle composite. In an illustrative suitable approach, such distribution may be achieved when the multi-functional Michael donor and the multi-functional Michael acceptor are each mobile under the conditions of temperature and pressure experienced before and/or during curing. Even if those donor and acceptor molecules were not well distributed at the start of the curing step, they become well distributed as the temperature and pressure are elevated in the mold. Such distribution may alternatively be achieved when, for example, a multi-functional Michael donor is mobile under the conditions of curing and a multi-functional Michael acceptor is relatively immobile, yet already well distributed among the wood particles (e.g., during formation of a population of plural reactive wood particles, and/or formation of the reactive wood particle blend). In such case, molecules of the mobile multi-functional Michael donor, even if poorly distributed at the start of curing, may move within the curable wood particle composite, by diffusion or other means, until the immobile, but already well distributed, multi-functional Michael donor is encountered and Michael reaction ensues. Alternatively, the multi-functional Michael donor may be mobile, while the multi-functional Michael acceptor is immobile, but well distributed. In yet another suitable approach, both the multi-functional Michael donor and the multi-functional Michael acceptor are immobile, or of limited mobility, but are each well distributed on the same wood particles or adjacent wood particles such that surface proximity (e.g., contact) of wood particles leads to Michael reaction with concomitant crosslinking without long range diffusion of either the donor or the acceptor. In such case, multi-functional Michael donors and acceptors having high molecular weights, even $M_w$ values of greater than 1,000,000 to 5,000,000 grams/mole or more could be usefully employed. The foregoing examples are just a few of many possible illustrations of the extent to which the mobility and distribution of multi-functional Michael donors and acceptors may influence the performance properties of the resultant cured wood particle composite. One of skill in the art will recognize that, while low molecular weight multi-functional Michael donor and acceptor molecules having $M_w$ of 400 g/mole or less are typically mobile under curing conditions, higher molecular weight Michael donor and acceptor molecules having $M_w$ of greater than 400 g/mole to no more than 2,000 g/mole are typically somewhat less mobile. Michael donors and acceptors having $M_w$ of greater than 2,000 to no more than 50,000 g/mole typically display reduced mobility under curing conditions, and Michael donors and acceptors having $M_w$ greater than 50,000 typically display low to slight mobility under curing conditions. Therefore, if poor distribution of a multi-functional Michael donor or acceptor is anticipated during formation of a curable wood particle composite, it may be advisable to select a donor or acceptor that is of relatively low $M_w$ and, therefore, of relatively high mobility under curing conditions.

An additional factor that may become important as the $M_w$ of multi-functional Michael donors or acceptors having polymeric skeletons increases is the glass transition temperature ("Tg") of that donor or acceptor. Typically a given Michael donor or acceptor having a polymeric skeleton will become more mobile if the temperature of curing exceeds the Tg of that donor or acceptor, making it more flexible, less rigid. Yet another factor influencing the mobility of a Michael donor or acceptor having an oligomeric or polymeric skeleton during the curing step is density of functionality of those donor or acceptor molecules and the extent to which those functional groups have reacted. Once one or more of its functional groups have reacted, a given multi-functional Michael donor or acceptor becomes part of a larger molecule such that it soon becomes part of polymeric network wherein it is tied to a specific locus (i.e., location) within the curing wood particle composite, substantially reducing or eliminating its mobility.

"Tg" is the "glass transition temperature" of a polymeric phase. The glass transition temperature of a polymer is the temperature at which a polymer transitions from a rigid, glassy state at temperatures below Tg to a fluid or rubbery state at temperatures above Tg. The Tg of a polymer is typically measured by differential scanning calorimetry (DSC) using the mid-point in the heat flow versus temperature transition as the Tg value. A typical heating rate for the DSC measurement is 20 Centigrade degrees per minute. The Tg of various homopolymers may be found, for example, in *Polymer Handbook*, edited by J. Brandrup and E. H. Immergut, Interscience Publishers. The Tg of a polymer is estimated by using the Fox equation (T. G. Fox, Bull. *Am. Physics Soc.*, Volume 1, Issue No. 3, page 123 (1956)). The practitioner will recognize that the Tg measured for a polymer of a given composition having an $M_w$ of, for example 50,000 g/mole, may be higher than that measured for polymers having lower $M_w$ (e.g., $M_w$ of 2,000 to 20,000 g/mole) and the same composition. Here the decrease in Tg with decreasing molecular weight (at molecular weights below about 50,000 g/mole) is thought to derive from decreasing polymer chain entanglement and increasing chain mobility.

A "strong base catalyst" is a basic compound having the characteristic that the $pK_a$ of its conjugate acid is greater than 12.5, and that it is capable of removing a Michael active hydrogen atom from a multi-functional Michael donor under at least one condition encountered during the method of making and curing the curable wood particle composite of the present invention.

The term "wood substance" includes wood furnish or another source of lignocellulosic material. "Lignocellulosic material" includes lignin. "Lignin" generally refers to a group of phenolic polymers that confer strength and rigidity to plant material. Lignins are very complex polymers with many random couplings, and thus they tend to be referred to in more generic terms. Lignins may include, for instance, analytical lignin preparations such as Brauns lignin, cellulolytic enzyme lignin, dioxane acidolysis lignin, milled wood lignin, Klason lignin, and periodate lignin, and industrial lignin preparations such as draft lignin and lignosulfonates. The term "wood substance" further includes natural organic carbohydrates and proteins, for example wheat flour and soy flour, such as soy protein isolate and defatted soy flour nonsulfonated draft lignin. The term "wood substance" still further includes flax and hemp. The term "wood substance" also includes cellulosic material.

Without wishing to be bound by any particular theory, it is believed that the strong base catalyst of the present invention should come into contact with one of more Michael active hydrogen atoms (defined infra) of the multi-functional Michael donor at some point during preparation of the cured wood particle composite of the present invention, for example, during any or all of: preparation of a functional component; preparation of plural reactive wood particles, preparation of a reactive wood particle blend; and a curing step. Depending on the nature of the strong base catalyst chosen to be a Michael ingredient of a functional component of the present invention, the strong base catalyst may, in pure form, be a solid, a liquid, or a gas under ambient conditions, each state of matter offering its own sets of challenges to, and opportunities for, achieving contact with Michael active hydrogen atoms. When the strong base catalyst is liquid in pure form and soluble in a liquid multifunctional Michael donor, the two may be combined to form a functional component which itself may be liquid. This resultant liquid functional component could then be sprayed, atomized, or otherwise usefully contacted with plural wood particles to form plural reactive wood particles. Alternatively, the strong base might be a solid or gas which, upon combination with a liquid multi-functional Michael donor, dissolves in that donor.

It is often desirable to have water present during the curing of the curable wood particle composite because the water, which may, for example, be in liquid or steam form (and may or may not be superheated) during curing at elevated temperature and pressure, is an excellent conductor of heat from mold surfaces into the interior of the curable wood particle composite. The hot water and steam may further dissolve or entrain any or all of the Michael reactants present in the curable wood particle composite to further enhance their uniform distribution. When the strong base catalyst is a water soluble solid (e.g., sodium hydroxide), the water may be further utilized to deliver and distribute that strong base catalyst in aqueous solution. Here, the aqueous solution of strong base catalyst is considered to be a functional component. Any concentration of strong base catalyst in its aqueous solution may be chosen to accomplish the desired distribution, provided that care is taken to avoid making the aqueous solution so dilute that an undesirably high level of water is added to the curable wood particle composite, or so concentrated that precipitation of the strong base catalyst occurs before the desired distribution within the curable wood particle composite is achieved. In another suitable approach, a strong base catalyst in solid particulate form may be distributed as a functional component within a population of plural wood particles or within a reactive wood particle blend if subsequent conditions of curing are capable of melting or dissolving that strong base catalyst such that it efficiently contacts the multi-functional Michael donor. In a further suitable approach to distributing Michael ingredients, at least one water-insoluble Michael ingredient is combined with water and a dispersion stabilizer such as a surfactant or a suspending agent, and the resultant mixture is agitated to form, respectively an aqueous emulsion or suspension, followed by contacting plural wood particles with the resultant aqueous dispersion. Useful surfactants may be found in, for example, Porter, M. R., Handbook of Surfactants, Chapman and Hall, New York, 1991. Illustrative suitable surfactants include: anionic surfactants, for example, sodium lauryl sulfate and sodium dodecyl benzene sulfonate; nonionic surfactants, for example, glycerol aliphatic esters and polyoxyethylene aliphatic esters; and amphoteric surfactants, for example, aminocarboxylic acids, imidazoline derivatives, and betaines. Suspending agents are typically water soluble polymers including, for example, polyvinyl alcohol, poly(N-vinylpyrrolidone), carboxymethylcellulose, gelatin, hydroxyethylcellulose, partially saponified polyvinyl acetate, polyacrylamide, polyethylene oxide, polyethyleneimine, polyvinylalkyl ethers, polyacrylic acid copolymers of polyacrylic acid, and polyethylene glycol.

Here again, the aqueous dispersion is considered to be a functional component. Of course, that aqueous dispersion may include more than one Michael ingredient, provided that at least one of those Michael ingredients is water insoluble under the conditions of formation of the functional component. Herein, "water insoluble" simply means that, under the conditions of forming a functional component as an aqueous dispersion, at least a portion of at least one Michael ingredient does not completely dissolve in the aqueous phase, yet is water dispersible in the presence of a surfactant and/or suspending agent.

Suitable functional components of the present invention may also contain one or more adjuvants chosen to improve the properties, such as, for example, solvents, waxes, water-repellent hydrophobes, tackifiers, emulsifiers, polymers, plasticizers, or thickeners. Adjuvants are preferably chosen to be compatible with the functional component and used in a way that does not interfere with the practice of the invention (for example, adjuvants will preferably be chosen that do not interfere with the mixing of the ingredients, the mixing of a functional component with plural wood particles to form plural reactive wood particles, the formation of a curable wood particle composite, the formation of a cured wood particle composite, or the final properties of the cured wood particle composite). Alternatively, the adjuvants may be added separately to one or more populations of plural wood particles, or to a reactive wood particle blend.

In choosing a specific multi-functional Michael donor and a specific multi-functional Michael acceptor to include in a functional component, and hence in the Michael reaction mixture, it is desirable to consider, respectively, their "Michael donor functionality" and "Michael acceptor functionality". It is generally believed that reacting a multi-functional Michael donor having a Michael donor functionality of 2 with a multi-functional Michael acceptor having a Michael acceptor functionality of 2 will lead to a Michael polymer having linear molecular structures. Often, it is desirable to create molecular structures that are branched and/or crosslinked, which is believed to require the use of at least one Michael donor or acceptor with Michael functionality of 3 or greater. Therefore, suitable Michael reaction mixtures will often include a multi-functional Michael donor, or a multi-functional Michael acceptor, or both having a Michael functionality of 3 or greater. A Michael polymer that is crosslinked is further termed a "Michael network polymer".

Suitable Michael donors of the present invention include a multi-functional Michael donor having a Michael donor functional group that has two Michael active hydrogen atoms attached to the same carbon atom (herein called "Michael twin" hydrogen atoms). Without wishing to be bound by any particular theory, it is believed that such Michael twin hydrogen atoms are typically available for "sequential hydrogen abstraction". With Michael twin hydrogen atoms, after the first Michael twin hydrogen atom has been abstracted, the cure will normally proceed by first abstracting a hydrogen atom from a different Michael donor functional group instead of abstracting the second Michael twin hydrogen atom. In sequential hydrogen abstraction, after most or all of functional groups with Michael twin hydrogen atoms have had one of the Michael twin hydrogen atoms abstracted, if further Michael addition reactions take place, the second Michael twin hydrogen atom may be abstracted from such functional groups. In some sequential hydrogen abstractions, the cure will stop when few or none of the second Michael twin hydrogen atoms are abstracted from Michael donor functional groups from which one Michael twin hydrogen atom has already been abstracted. There may also be "non-sequential hydrogen abstractions" in which both Michael twin hydrogen atoms may be abstracted from a single Michael donor functional group before most or all of the functional groups with Michael twin hydrogen atoms have had one hydrogen atom abstracted. In the practice of the present invention, sequential and non-sequential hydrogen abstractions are also contemplated in any combination.

In the Michael reaction mixtures of the present invention, the relative proportion of multi-functional Michael acceptors to multi-functional Michael donors can be characterized by the "reactive equivalent ratio", which is the ratio of the number of all the functional groups (I) in the Michael reaction mixture to the number of Michael active hydrogen atoms in the Michael reaction mixture. In some suitable Michael reaction mixtures, the reactive equivalent ratio is at least 0.1:1, at least 0.2:1, at least 0.3:1, at least 0.4:1, or at least 0.45:1; and no more than 3:1, no more than 1.75:1, no more than 1.5:1, or no more than 1.25:1.

The practice of the present invention involves the use of at least one multi-functional Michael acceptor. Suitable multi-functional Michael acceptors include those having a skeleton that is the residue of a polyhydric alcohol, such as, for example, those listed herein above. Other suitable multi-functional Michael acceptors include those having a skeleton that is a polymer, such as for example, a poly alkylene oxide, a polyurethane, a polyethylene vinyl acetate, a polyvinyl alcohol, a polydiene, a hydrogenated polydiene, an alkyd, an alkyd polyester, a (meth)acrylic polymer, a polyolefin, a halogenated polyolefin, a polyester, a halogenated polyester, a copolymer thereof, or a mixture thereof. In further suitable multi-functional Michael acceptors, the skeleton of the multi-functional Michael acceptor may be an oligomer.

Some suitable multi-functional Michael acceptors in the present invention include, for example, molecules in which some or all of the structures (I) are residues of (meth)acrylic acid, fumaric acid, or maleic acid, substituted versions thereof, or combinations thereof, attached to the multi-functional Michael acceptor molecule through an ester linkage. A compound with structures (I) that include two or more residues of (meth)acrylic acid attached to the compound with an ester linkage is called herein a "poly-functional (meth)acrylate." Poly-functional (meth)acrylates with at least two double bonds capable of acting as the acceptor in Michael addition are suitable multi-functional Michael acceptors in the present invention. Preferred poly-functional (meth)acrylates are poly-functional acrylates (compounds with two or more residues of acrylic acid, attached with an ester linkage).

Examples of suitable multi-functional Michael acceptors that are poly-functional acrylates include 1,4-butanediol diacrylate, 1,6-hexanediol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, cyclohexane dimethanol diacrylate, alkoxylated hexanediol diacrylate, alkoxylated cyclohexane dimethanol diacrylate, propoxylated neopentyl glycol diacrylate, glyceral triacrylate, trimethylolpropane triacrylate, ethoxylated trimethylolpropane triacrylate, propoxylated trimethylolpropane triacrylate, isosorbide diacrylate, acrylated polyester oligomer, bisphenol A diacrylate, ethoxylated bisphenol A diacrylate, tris(2-hydroxyethyl)isocyanurate triacrylate, acrylated epoxidized soybean oil, acrylated aliphatic urethane oligomer, acrylated aromatic urethane oligomer, and the like, and mixtures thereof. Analogs of any of these multi-functional Michael acceptors having one or more acrylate groups replaced by methacrylate are further contemplated by the present invention.

Also suitable as the multi-functional Michael acceptor are poly-functional (meth)acrylates in which the skeleton is polymeric. The (meth)acrylate groups may be attached to the polymeric skeleton in any of a wide variety of ways. For example, a (meth)acrylate ester monomer may be attached to a polymerizable functional group through the ester linkage, and that polymerizable functional group may be polymerized with other monomers in a way that leaves the double bond of the (meth)acrylate group intact. For another example, a polymer may be made with functional groups (such as, for example, a polyester with residual hydroxyls), which may be reacted with a (meth)acrylate ester (for example, by transesterification), to yield a polymer with pendant (meth)acrylate groups. For yet another example, a homopolymer or copolymer may be made that includes a poly-functional acrylate monomer (such as trimethylol propane triacrylate) in such a way that not all the acrylate groups react. When a suitable skeleton of the multi-functional Michael acceptor is a polymer, the functional groups (I) may be pendent from the polymer chain, or they may be incorporated into the polymer chain, or a combination thereof. Examples of polymers having functional groups (I) incorporated into the polymer chain are polyesters formed using maleic acid or maleic anhydride as a monomer.

More than one suitable multi-functional Michael acceptor may be utilized in the preparation of the curable wood particle composite of the present invention. When more than one multi-functional Michael acceptor is so utilized, all such multi-functional Michael acceptors may be incorporated into a single functional component, or divided among multiple functional components. For example, a suitable approach to delivery of two distinct multi-functional Michael acceptors to form a curable wood particle composite is to include one of the multi-functional Michael acceptors in a first functional component and include the other multi-functional Michael acceptor in a second functional component. Alternatively, all of one of the multi-functional Michael acceptors, along with a portion of the other multi-functional Michael acceptor could be included in a first functional component, while the remaining portion of the other multi-functional Michael acceptor could be included in a second functional component. It will be recognized that the foregoing approaches are illustrative of the wide range of ways in which not only multi-functional Michael acceptors, but also multi-functional Michael donors and strong base catalysts of the present invention may be apportioned among functional components and delivered to the curable wood particle composite. Hence, the method of the present invention contemplates one or more of any of multi-functional Michael acceptor, multi-functional Michael donor, and strong base catalyst, and further contemplates any approach for their delivery that accomplishes the formation of a curable wood particle composite that can be cured to form a cured wood particle composite having desired properties.

The practice of the present invention involves the use of a multi-functional Michael donor. Suitable multi-functional Michael donors include those having a skeleton that is the residue of a polyhydric alcohol, such as, for example, those listed herein above. Alternatively, suitable multi-functional Michael donors include those having a skeleton that is a polymer, such as for example, a poly alkylene oxide, a polyurethane, a polyethylene vinyl acetate, a polyvinyl alcohol, a polydiene, a hydrogenated polydiene, an alkyd, an alkyd polyester, a polyolefin, a halogenated polyolefin, a polyester, a halogenated polyester, a (meth)acrylate polymer, a copolymer thereof, or a mixture thereof. In further suitable multi-functional Michael donors, the skeleton of the multi-functional Michael donor may be an oligomer. Other suitable multi-functional Michael donors include those having a skeleton that is a polymer, such as those just listed, with the proviso that the polymer is not a polyvinyl alcohol having a portion of its hydroxy groups acetoacetoxylated or a copolymer of vinyl acetate including, as polymerized units, an unsaturated acetoacetoxy monomer. When a suitable skeleton of the multi-functional Michael donor is a polymer, the Michael donor functional group may be pendant from the polymer chain, or it may be incorporated into the polymer chain, or a combination thereof.

In suitable multi-functional Michael donors, the functional groups with Michael active hydrogen atoms may be attached to the skeletons in any of a wide variety of arrangements. In some suitable arrangements, the multi-functional Michael donor has the structure

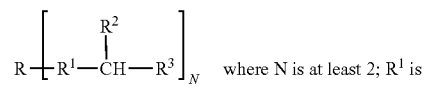 where N is at least 2; $R^1$ is

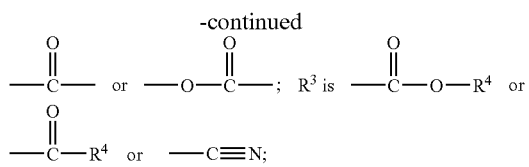

$R^2$ and $R^4$ are, independently, H, alkyl (linear, cyclic, or branched), aryl, alkaryl, or substituted versions thereof; and R is a residue of any of the polyhydric alcohols or polymers discussed herein above as suitable as the skeleton of a multi-functional Michael donor. In some suitable arrangements, $R^2$ will be the residue of a Michael acceptor. In some suitable arrangements, $R^2$ or $R^4$ will be attached to further functional groups with Michael active hydrogen atoms.

Some suitable multi-functional Michael donors include, for example, malonic acid, acetoacetic acid, amides of malonic acid, amides of acetoacetic acid, alkyl esters of malonic acid, and alkyl esters of acetoacetic acid, where the alkyl groups may be linear, branched, cyclic, or a combination thereof. Other suitable multi-functional Michael donors include polyhydric alcohols in which one or more hydroxyl group is linked to an acetoacetate group through an ester linkage. Some suitable multi-functional Michael donors are, for example, methyl acetoacetate, ethyl acetoacetate, t-butyl acetoacetate, other alkyl acetoacetates, isosorbide acetoacetate, isosorbide diacetoacetate, 2-acetoacetoxyethyl (meth) acrylate, butane diol diacetoacetate, 1,6-hexanediol diacetoacetate, other diol diacetoacetates, trimethylol propane triacetoacetate, glycerol triacetoacetate, pentaerythritol triacetoacetate, other triol triacetoacetates, analogous malonate esters, and the like.

Additional suitable multi-functional Michael donors include compounds with one or more of the following functional groups: acetoacetate, acetoacetamide, cyanoacetate, and cyanoacetamide; in which the functional groups may be attached to one or more of the following skeletons: castor oil, polyester polymer, polyether polymer, (meth)acrylic polymer, polydiene polymer. Some suitable multi-functional Michael donors are, for example, acetoacetate functional castor oil, acetoacetate functional polyester polymer, acetoacetate functional polyesteramide polymer, acetoacetamide functional polyether polymer, acetoacetate functional (meth) acrylic polymer, cyanoacetamide functional (meth)acrylic polymer, cyanoacetate functional (meth)acrylic polymer, acetoacetate functional polybutadiene polymer.

Some preferred multi-functional Michael donors are multifunctional acetoacetate functional polyester polymers and acetoacetate functional polyesteramide polymers. Acetoacetate functional polyester polymers may be made by any available method; one method, for example, is a two step process. In the first step, one or more polyhydric alcohol such as a diol or triol is condensed with one or more di- or tricarboxylic acids to form a polyester terminated with hydroxy radicals. In the second step, the polyester is reacted with an acetoacetonate compound such as, for example, an alkyl acetoacetonate with a alkyl group with 1 to 4 carbon atoms. Similarly, acetoacetate functional polyesteramide polymers may be made by any available method; one method, for example, is a two step process. In the first step, one or more polyhydric alcohol such as a diol or triol, including at least one amino alcohol, is condensed with one or more di- or tricarboxylic acids to form a polyesteramide terminated with hydroxy radicals. In the second step, the polyesteramide is reacted with an acetoacetonate compound such as, for example, an alkyl acetoacetonate with a alkyl group with 1 to 4 carbon atoms.

In suitable functional components of the present invention, the structure (I) will be attached to a molecule that is separate from the molecule to which the Michael donor functional group is attached. Also contemplated are other suitable functional components which include "dual Michael donor/acceptor ingredients" in which the structure (I) and the Michael donor functional group are attached to the same molecule; that is, a molecule could function as both the Michael donor and the Michael acceptor if it has at least one structure (I) and at least one Michael donor functional group. In one example of a dual Michael donor/acceptor ingredient, malonate molecules are incorporated into the backbone of a polyester polymer, and the ends of that polymer have acrylic functionality. In a second example of a dual Michael donor/acceptor ingredient, maleic acid and/or maleic anhydride is incorporated into the backbone of a polyester polymer, and the ends of that polymer have acetoacetate functionality. To be effective at forming crosslinks or branches, a dual Michael donor/acceptor ingredient must, as a minimum condition, include at least two Michael donor functionalities, or at least two Michael acceptor functionalities. Still further contemplated are: multi-functional Michael donors that include more than one type of Michael donor functional group; multi-functional Michael acceptors that include more than one type of Michael acceptor functional group; and dual Michael donor/acceptor ingredients including more than one type of Michael donor functional group, Michael acceptor functional group, or both.

The "strong base catalyst" of the present invention is a basic compound for which the $pK_a$ of its conjugate acid is greater than 12.5, at least 12.7, or at least 12.9. There is no particular upper limit to the strength of the strong base catalyst. A strong base catalyst for which the $pK_a$ of its conjugate acid is no more than 13.5, no more than 13.8, or no more than 14.0 is within scope of the present invention. The $pK_a$ of the conjugate acid of a base is a well known characteristic, and values of $pK_a$'s for the conjugate acids of many bases have been published, for example in the *Handbook of Chemistry and Physics*, $82^{nd}$ edition, CRC Press, 2001. While values of $pK_a$ are sometimes measured in aqueous solution, the $pK_a$ itself is a characteristic of a compound, whether or not the compound is actually used in an aqueous solution, pure state, or any other form.

The practice of the present invention involves the use of a strong base catalyst. A "strong base catalyst" as used herein, is a basic compound that will, typically, catalyze a carbon-Michael addition reaction at ambient temperature. While not wishing to be bound by any particular theory, it is believed that the strong base catalyst abstracts a hydrogen ion from the Michael donor. The practitioner will recognize that a strong base catalyst may exhibit excessively high reactivity with the multi-functional Michael donor (removal of an active hydrogen atom to form an anion) for some combinations of Michael ingredients under some conditions during formation of the curable and cured wood particle composites of the present invention. This excessively high reactivity under such conditions may, in turn, promote excessively fast reaction of the activated multi-functional Michael donor with a multi-functional Michael acceptor, resulting in premature Michael polymer formation before or during formation of the curable wood particle composite. Such premature Michael polymer formation typically manifests itself as poor performance of the resultant cured wood particle composite. It will be further recognized that there may be conditions under which the strong base catalyst may cause undesirable side reactions involving either or both of the multi-functional donor and multi-functional acceptor.

Some compounds that are known to function as strong base catalysts are, for example, certain amine compounds, ammonium compounds, acetylacetate compounds, hydroxides, and alkoxides. Among the suitable amine compounds are, for example, piperidine and amidine compounds. Amidine compounds contain the radical group

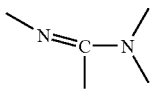

Some suitable amidine compounds include, for example, guanidine and cyclic amidine compounds such as, for example, 1,8-diazabicyclo[5.4.0]undec-7-ene (DBU) and 1,5-diazabicyclo[4.3.0]non-5-ene (DBE). Among the suitable ammonium compounds are, for example, quaternary ammonium hydroxides such as, for example, tetramethyl ammonium hydroxide, tetrapropyl ammonium hydroxide, tetraethyl ammonium hydroxide, tetrabutyl ammonium hydroxide, and tetraoctyl ammonium hydroxide. Among the suitable acetylacetate compounds are, for example, alkali acetylacetonates such as, for example, sodium acetylacetonate and potassium acetylacetonate.

Among the hydroxide compounds suitable as the strong base catalyst are, for example, sodium hydroxide and potassium hydroxide. Among the alkoxides suitable as the strong base catalyst are, for example, sodium alkoxides and potassium alkoxides such as, for example, sodium methoxide, sodium ethoxide, sodium propoxide, sodium butoxide, potassium methoxide, potassium ethoxide, potassium propoxide, and potassium butoxide.

Also suitable as strong base catalysts are compounds similar to those listed above and mixtures of suitable strong base catalysts.

A functional component of the present invention, when it is freshly prepared, should have a useful viscosity. The correct value of viscosity will be determined by the means used to mix the ingredients (when a functional component includes more than one ingredient) and to contact them with plural wood particles or blends of plural wood particles. Viscosity is preferably measured at the temperature at which the functional component will be applied to the plural wood particles or blends of plural wood particles. Typically, the viscosity of the functional component is at least 0.1 Pa·s (100 cps), at least 0.2 Pa·s (200 cps), or at least 0.4 Pa·s (400 cps); and no more than 10 Pa·s (10,000 cps), no more than 6 Pa·s (6,000 cps), or no more than 3 Pa·s (3,000 cps).

A functional component preferably has a useful pot life. One convenient method of measuring the pot life is to measure the time from the formation of the functional component until its viscosity becomes so high that the functional component can no longer be applied to the plural wood particles or their blends. For any specific suitable approach, the viscosity of the freshly-prepared functional component may be measured by any standard method. Viscosity measurement should be made at a temperature characteristic of the temperature at which the functional component will contact the plural wood particles or their blends and at which the reactive wood blend may be further mixed and shaped into the curable wood particle composite. One useful measure of the pot life is the time required for the viscosity, at that temperature, to rise by a factor of 5×. Typically, the pot life of the functional component is at least 5 minutes, at least 10 minutes, at least 25 minutes, at least 1 hour, or at least 2 hours. There is no particular upper limit to pot life, however, when one or two types of Michael ingredient are present in a single functional component, the upper limit of pot life will often be no more than 12 months, no more than 1 month, no more than 7 days, or no more than 24 hours. Some suitable functional components will have useful pot life determined at 25° C., while others will have useful pot life determined at, for example, 50° C., depending on the temperature at which the plural wood particles or their blends are contacted with the functional component and the temperatures associated with further mixing of the reactive wood particle blend and formation of the curable wood particle composite.

A "wood particle" is a particle including a wood substance. A wood particle may be regular in shape or irregular in shape. Typically, the longest aspect (longest dimension) of a wood particle will be no longer than the longest dimension of the wood particle composite to be formed. A case in which the longest aspect of a wood particle might be longer than the longest dimension of the wood particle composite which includes that wood particle is one in which all or a portion of the wood particles are flexible fibers or thin slivers. The term "plural wood particles" denotes a population of: at least 5, at least 10, or at least 100 wood particles. The practitioner will recognize that there is no particular upper limit to the number of plural wood particles, that upper limit being determined by such factors as the total capacity of equipment used to accomplish the steps of the method of the present invention, sizes of the wood particles, and the bulk density of the plural wood particles, the plural reactive wood particles, the curable composites, and cured composites during various process steps in the method of making the cured wood particle composite of the present invention. Hence, a suitable upper limit for the number of wood particles in a population of plural wood particles may be: no more than $1 \times 10^{12}$, $1 \times 10^{9}$, $1 \times 10^{6}$, $1 \times 10^{3}$, or $2 \times 10^{2}$. In certain suitable cases, the upper limit of the number of wood particles in a population of plural wood particles may be substantially higher than $1 \times 10^{12}$, even by several orders of magnitude. The plural wood particles may be similar in size and/or shape and in the distribution of sizes and shapes, or may vary substantially in size and/or shape, and in the distribution of sizes and shapes. Illustrative examples of size and shape based descriptions of types of plural wood particles include, but are not limited to: wood slivers, wood chips, wood flakes, wood flour, and wood fibers.

The methods and compositions of the present invention are directed to formation of curable and cured wood particle composites including populations of plural wood particles and not to laminar structures in which, for example, relatively large pieces of wood (e.g., boards, slabs, and strips) typically, but not necessarily, having similar and uniform dimensions are bonded to each other as a series of parallel, or substantially parallel, layers. Such laminar structures are not contemplated as either the curable composite or the cured composite of the present invention. The plural wood particles of the present invention are of a size, shape, and number such that they are capable of being mixed by such methods as tumbling and agitation (see infra) and of being shaped to form the curable wood particle composite without use of any particular alignment procedure for individual adjacent particles. Typically, the average weight of a wood particle in a population of plural wood particles will be no more than 10, no more than 1, no more than 0.1, or no more than 0.01 weight percent, based on the total weight of those plural wood particles.

A simple, commonly used method of characterizing the particle size distribution for a population of plural wood particles is sieve analysis. The wood particles are passed through a series of sieves (i.e., a stack of sieves) of decreasing opening size. The opening size is indicated for United States Standard sieves using mesh terminology. Mesh designates the number of openings and fractional parts of an opening, per lineal inch. Mesh is determined by counting the number of openings from the center of any wire to the center of a parallel wire, one inch (25.4 mm) in distance. For example, a designation of 100 mesh derived from the ASTM specification E-11-95, consists of a screen with wire of 0.110 mm (110 µm, 0.0043 in) diameter containing 100 openings per linear inch (100 openings/25.4 mm; 4 openings/mm) with an opening of 0.150 mm (150 µm; 0.0059 in). A given wood particle drops through successive sieves until encountering a sieve having sufficiently small openings that further passage is impeded. If that particle is sufficiently small, it may even pass through the final sieve of the stack, coming to rest in a pan call a "balance pan". The sieves are then separated, and the sub-populations of particles trapped on each sieve are weighed. A weight percent is calculated for each sub-population, based upon the weight of the total population of wood particles, and recorded as a function of a range of mesh sizes bracketed by the mesh size of the sieve which trapped the sub-population and the mesh size of the last sieve eluded by that sub-population. If a sub-population of wood particles is found on the balance pan, the weight percent for that sub-population is simply designated as the balance pan fraction, or the weight percent through the smallest mesh size eluded by that sub-population. For example, if a sub-population weighing 5 grams, out of a total population weighing 100 g, is found on a balance pan, and the sieve resting on the balance pan and immediately above it has an opening size of 75 µm (microns; 200 Mesh), then the amount of that sub-population is linked to its particle size by the designation "5 weight percent through 75 µm". In U.S. Standard Sieve scale terminology, this designation would be "5 weight percent through 200 Mesh", or "5 weight percent 'Thru 200 Mesh'". Table A illustrates how some typical populations of wood flour particles (plural wood particles I-VII) are classified using standardized (U.S. Standard) sieving techniques.

a suitable population of plural wood particles might have a single composition, the composition including a single wood substance. In another example, a portion of the wood particles of a suitable population of plural wood particles might have one composition including a single wood substance, while another portion of the wood particles might have another composition including one or more wood substances.

"Plural untreated wood particles" may be "treated with" ("contacted with") a "Michael functional component" ("functional component") to form "plural Michael reactive wood particles" ("plural reactive wood particles"). The plural Michael reactive wood particles may be, without further addition of any other populations of plural wood particles (reactive or untreated), blended with another Michael functional component to form a reactive wood particle blend that is shaped to form the curable wood particle composite of the present invention. In such case, the reactive wood particle blend, and hence the curable wood particle composite, must include a Michael reaction mixture which, by definition, includes at least one of each of the three types of Michael ingredient: multi-functional Michael donor; multi-functional Michael acceptor; and strong base catalyst. Further, any Michael functional component must contain one or two types of Michael ingredient. Herein, "blending" means any process that in any way changes the distribution of any of the Michael ingredients among the plural wood particles and/or changes the orientation of any of the wood particles with respect to any other of the wood particles. "Blending", therefore, includes tumbling and agitation techniques, but also includes any motion that reorients treated wood particles, untreated wood particles, any Michael functional components, or any combination thereof, with respect to one another. The blending may be vigorous, as in high speed mixing. Alternatively, blending may be as gentle as vibration on a conveyor belt or the reorientation of wood particles and Michael functional components that accompanies the filling a mold. Further, the step of contacting may occur: before the step of blending; during the step of blending; or both before and during the step of blending.

The method of the present invention more generally comprises the steps of: (a) providing at least one population of plural untreated wood particles; (b) providing at least two Michael functional components; (c) contacting a population of the plural untreated wood particles with a Michael functional component to form plural Michael reactive wood par-

TABLE A

Typical hardwood grades of wood flour.

| U.S. Standard Sieve, Mesh[a] | Sieve opening size[b], µm | I[c] (wt %) | II (wt %) | III (wt %) | IV (wt %) | V (wt %) | VI (wt %) | VII (wt %) |
|---|---|---|---|---|---|---|---|---|
| 10 | 2000 | T[d] | N/U[e] | N/U | N/U | N/U | N/U | N/U |
| 20 | 850 | 10 | T | N/U | N/U | N/U | N/U | N/U |
| 40 | 425 | 50 | 5 | T | N/U | N/U | N/U | N/U |
| 60 | 250 | 30 | 55 | 10 | T | N/U | N/U | N/U |
| 80 | 180 | N/U | 35 | 40 | 10 | T | N/U | N/U |
| 100 | 150 | N/U | N/U | 40 | 25 | 3 | T | N/U |
| 120 | 125 | N/U | N/U | N/U | 35 | 17 | 2 | T |
| 140 | 106 | N/U | N/U | N/U | N/U | 30 | 18 | 4 |
| 200 | 75 | N/U | N/U | N/U | N/U | N/U | 45 | 41 |
| Balance Pan | Balance Pan | 10 | 5 | 10 | 30 | 50 | 35 | 55 |

[a]defined as the number of 0.110 mm wires per linear inch;
[b]mesh opening between parallel wires;
[c]populations I-VII of plural wood particles;
[d]T = Trace, <0.09 grams in a 25 gram sample;
[e]N/U = Sieve not used.

The compositions of the wood particles included in a population of plural wood particles of the present invention may be all the same, or may differ. For example, all wood particles of ticles; (d) blending any remaining plural untreated wood particles and any of the plural Michael reactive wood particles to form a reactive wood particle blend; and (e) shaping the reactive wood particle blend to form a curable wood particle composite. The step of contacting occurs: before the step of blending; during the step of blending; or both before and during the step of blending. Each Michael functional component comprises one or two types of Michael ingredient selected from: (i) a multi-functional Michael donor; (ii) a multi-functional Michael acceptor; and (iii) a strong base catalyst having a conjugate acid which has a $pK_a$ of greater than 12.5. Further, the Michael functional components, taken together, comprise: at least one of the multi-functional Michael donor; at least one of the multi-functional Michael acceptor; and at least one of the strong base catalyst.

The step of contacting of the present invention may be accomplished by any means known in the art, for example, spraying, roller coating, flow coating, curtain coating, dipping, slurrying and filtration, and combinations thereof. A functional component may be further distributed among a population of plural untreated wood particles, a population of plural reactive wood particles, or a reactive wood particle blend by any means known in the art, for example, tumbling, shaking, agitation (e.g., paddle blade, or impeller), extrusion, co-extrusion, auger conveyance, vibration, and combinations thereof. The vibration may simply be the result of conveyance or other forms of transfer, such as, for example, the shaping of a reactive wood particle blend into a curable wood particle composite.

The method of making a curable wood particle composite, the curable wood particle composite composition, the method of curing the curable wood particle composite to form the cured wood particle composite, and the cured wood particle composite composition of the present invention all contemplate formation of a reactive wood particle blend including: one or more populations of plural reactive wood particles; and no, one, or multiple populations of plural untreated wood particles. Populations of plural reactive wood particles may be the same or different in any or all of such characteristics as composition, size distribution, and shape distribution of wood particles, and composition and amount of incorporated Michael functional component. Populations of plural untreated wood particles may be the same or different in any or all of such characteristics as, for example, composition, size distribution, and shape distribution.

In a suitable approach to forming the reactive wood particle blend of the present invention, a Michael functional component may further be added to an untreated wood particle blend or may be added to a reactive wood particle blend.

Any of the three "types of Michael ingredient", that is, multi-functional Michael donor, multi-functional Michael acceptor, or strong base catalyst, included in a Michael functional component of the present invention is considered to be a "Michael ingredient" of that functional component. It is a minimum requirement of the present invention that at least two functional components are utilized in the preparation of a curable wood particle composite. It is a further requirement that the at least two Michael functional components, taken together, must include at least one of each of the three types of Michael ingredient. Other ingredients, such as water, any solvent, and adjuvants that may be present in a functional component are termed "non-Michael ingredients" of that functional component.

A "reactive wood particle blend" may be formed prior to, or during the formation of a curable wood particle composite. A reactive wood particle blend may include only one population of plural wood particles (e.g., plural first reactive particles) or multiple populations of plural wood particles. When a reactive wood particle blend contains multiple populations of plural wood particles, at least one population will be plural reactive wood particles.

A reactive wood particle blend is shaped into a "curable wood particle composite". A "curable wood particle composite" includes "plural reactive wood particles". A curable wood particle composite can be subjected to "curing" to form a "cured wood particle composite". Here, "curing" includes the Michael reaction of a multi-functional Michael donor with a multifunctional Michael acceptor in the presence a strong base catalyst and plural wood particles. During the curing step of the present invention, a Michael polymer is formed, wherein the Michael polymer includes Michael linkages formed by the reaction of a Michael donor functional group of a Michael donor with a Michael acceptor functional group of a Michael acceptor. There are no particular limitations on the dimensions of the curable wood particle composite of the present invention. The smallest dimension, for example, may be: at least 0.01 mm, at least 0.1 mm, at least 1 mm, or at least 1 cm. The largest dimension, for example, may be: no more than 100 m, no more than 10 m, no more than 5 m, or no more than 1 m. The present invention further contemplates even greater lengths for the largest dimension. For example, continuous processes making relatively flexible cured wood particle composites (e.g., paper, or film) capable of being stored as a roll may have a largest dimension of hundreds of meters.

In an illustrative example of the method of making and curing the curable wood particle composite of the present invention, a first functional component is prepared by mixing a multi-functional Michael donor and a multi-functional Michael acceptor. Plural first untreated wood particles are provided and contacted with the first functional component to form plural first reactive wood particles. Plural second untreated wood particles are also provided and contacted with a second functional component including a strong base catalyst absent any multi-functional Michael donor or acceptor to form plural second reactive wood particles. A step of blending is used to distribute the population of plural first reactive wood particles among the plural second reactive wood particles. The reactive wood particle blend formed is introduced into a compression mold in a step of shaping the reactive wood particle blend to form a curable wood particle composite. The compression mold is capable of subjecting the curable wood particle composite to elevated temperature and pressure. A step of curing follows in which the temperature and pressure experienced by the curable wood particle composite within the compression mold are sufficiently elevated to accomplish the strong base catalyzed reaction of the multi-functional Michael donor with the multi-functional Michael acceptor, thereby forming a cured wood particle composite. The step of curing the curable wood particle composite may result in further shaping to form the shape of the cured wood particle composite. The cured wood particle composite is then released from the compression mold. In this illustrative approach, the plural first reactive wood particles and the plural second reactive wood particles may be in any weight ratio with respect to one another and may be the same or different in particle size and particle size distribution, and in particle shape and particle shape distribution. Further, the blending step may be continued until the distribution of plural second reactive wood particles within the reactive wood particle blend is maximized, or the blending step may be discontinued at some point before that maximum distribution has been achieved. Such reactive wood particle blends having non-maximal distribution are useful for bringing the strong base catalyst into close, but not yet intimate, contact with the multi-functional Michael donor and the multi-functional acceptor. Further distribution of the strong base catalyst, as well as the other Michael ingredients, is thereby postponed until some point during the curing step. In this way, any potentially negative effects of the strong base catalyst, such as premature Michael polymerization or undesirable side reactions with the Michael donor or the Michael acceptor, are minimized or entirely eliminated, yet intimate contact of Michael ingredients occurs during curing, thereby maximizing the distribution of Michael polymer in the resultant cured wood particle composite.

Typically, a population of plural wood particles (reactive or untreated) is present in the reactive wood particle blend in an amount of: at least 0.1, at least 1, or at least 5 weight percent; and no more than 100, no more than 99.9, no more than 99, or no more than 95 weight percent, based on the combined weight of all plural wood particles present in the reactive wood particle blend.

The method of making and curing the curable wood particle composite of the present invention is further illustrated in a suitable approach in which a first functional component includes a multi-functional Michael donor. Plural first untreated wood particles are provided and contacted with the first functional component to form plural first reactive wood particles. Plural second untreated wood particles are provided and contacted with a second functional component, which includes a multi-functional Michael acceptor, to form plural second reactive wood particles. Plural third untreated wood particles are provided and contacted with a third functional component, which includes a strong base catalyst, to form plural third reactive wood particles. A curable wood particle composite is formed wherein the curable wood particle composite includes the plural first, plural second, and plural third reactive wood particles. The populations of plural first, plural second, and plural third reactive wood particles are blended to intermix individual wood particles, and the Michael ingredients for which they are carriers, to form a reactive wood particle blend. The reactive wood particle blend is introduced into a compression mold in a step of forming a curable wood particle composite. Appropriately selected conditions of temperature and pressure are applied within the compression mold with resultant formation of a cured wood particle composite, followed by release of the cured wood particle composite from the mold.

Other suitable approaches illustrative of the method of making and curing the curable wood particle composite of the present invention include those in which plural first untreated wood particles are contacted with a first functional component to form plural first reactive wood particles and plural second untreated wood particles are contacted with a second functional component to form plural second reactive wood particles. The first functional component includes two types of Michael ingredient selected from the group: multi-functional Michael donor, multi-functional Michael acceptor, and strong base catalyst. The second functional component includes the member of that group which is a type of Michael ingredient not included in the first functional component. In this way the first functional component could include: multi-functional Michael donor and multi-functional Michael acceptor; multi-functional Michael donor and strong base catalyst; or multi-functional Michael acceptor and strong base catalyst. The corresponding second functional component would then, respectively, include: strong base catalyst; multi-functional Michael acceptor; or multi-functional Michael donor. A curable wood particle composite is formed wherein the curable wood particle composite includes the plural first and plural second reactive wood particles. A step of blending of populations of plural first and plural second reactive wood particles to form a reactive wood particle blend is followed by, or concurrent with introduction of that blend into a mold to form the curable wood particle composite. Compression molding follows to form a cured wood particle composite. In a variant of this approach, the first functional component contains only one type of Michael ingredient selected from the group: multi-functional Michael donor, multi-functional Michael acceptor, and strong base catalyst. The second functional component contains only one other type of Michael ingredient of that group, so that the reactive wood particle blend initially formed by blending plural first and plural second reactive wood particles is absent one type of Michael ingredient. The reactive wood particle blend thus formed is then contacted with that previously absent Michael functional component. For example, the plural first reactive wood particles could include a first functional component which includes a Michael donor, while the plural second wood particles include a second functional component which includes a Michael acceptor. The reactive wood particle blend formed by blending of the two populations of reactive wood particles is then contacted with a third functional component including a strong base catalyst (e.g., as an aqueous solution) absent any plural third reactive wood particles.

In another suitable illustrative approach, introduction of one or more populations of untreated wood particles during formation of a reactive wood particle blend may be undertaken, for example, to reduce the volume of wood particles that must be treated, or to encourage specific localized placement of functional components, and hence Michael ingredients, within a given reactive wood particle blend. The incorporation of one or more population of plural untreated wood particles is particularly effective for sequestering the strong base catalyst, reducing the surface-to-surface contact of reactive wood particles including a multi-functional Michael acceptor and/or donor with reactive wood particles including a strong base catalyst until diffusion occurs during the curing step.

In another suitable illustrative approach, greater than 50 weight percent of one population of plural wood particles (reactive or untreated) passes through a selected sieve opening size while greater than 50 weight percent of at least one other population of plural wood particles (reactive or untreated) does not pass through that same sieve opening size. Typically, in this suitable illustrative approach: at least 60, at least 70, at least 80, or at least 90 weight percent of one population of wood particles, based on the total weight of that population, passes through a selected sieve opening size, while at least 60, at least 70, at least 80, or at least 90 weight percent of another population of plural wood particles, based on the total weight of that population, does not pass through the same opening size. For example, plural untreated wood particles, 95 weight percent of which do not pass through a sieve having 250 µm sieve openings, are blended with plural first reactive wood particles, 95 weight percent of which do pass through a sieve having 250 µm sieve openings and with plural second reactive wood particles, 80 weight percent of which do pass through a sieve having 250 µm sieve openings, and include strong base catalyst. The smaller plural first reactive wood particles include a first functional component, itself including a multi-functional Michael donor and a multi-functional Michael acceptor. Plural second reactive wood particles include a strong base catalyst. Each of the plural first and second reactive wood particles are further provided in an amount of 10 percent by weight, based upon the combined weight all of the plural reactive wood particles and the plural untreated wood particles. The step of blending distributes the plural first and second reactive wood particles throughout the plural untreated wood particles during formation of the reactive wood particle blend. In this example, the relatively small size and high surface area of the plural first and second reactive wood particles, combined with their distribution throughout the interstitial space among the larger plural untreated wood particles, encourages sequestration of the strong base catalyst, and of the multi-functional Michael donor and acceptor, prior to curing, thereby encouraging uniform curing of the curable wood particle composite subsequently, or concurrently, formed from the reactive wood particle blend.

Suitable illustrative approaches also include those in which a functional component includes a strong base catalyst in solid particulate form. A purpose of providing the strong base in solid particulate form is to sequester that base from the multifunctional Michael donor and the multifunctional Michael acceptor until a point during the curing step when the facile movement of water (e.g., as hot water, steam, or superheated water) can dissolve, entrain, or otherwise cause the diffusion and distribution of the strong based such that it can contact the multi-functional Michael donor to catalyze the desired Michael reaction. For example, plural first reactive wood particles may be formed by contacting first plural untreated wood particles with a first functional component including a multi-functional Michael donor and a Multi-functional Michael acceptor. The plural first reactive wood particles are then contacted with a second functional component including a strong base catalyst in solid particulate form and blended to form a reactive wood particle blend having the strong base catalyst distributed in the interstitial space among the plural first reactive wood particles such that its opportunity for the intimate contact with the multi-functional Michael donor and acceptor is greatly impeded until some point during the curing step. Of course this suitable illustrative approach more generally includes approaches in which the reactive wood particle blend includes the multi-functional Michael donor in one population of plural reactive wood particles, the Multi-functional Michael acceptor in another population of plural reactive wood particles, the strong base catalyst present in solid particulate form, and, optionally, plural untreated wood particles.

In another suitable illustrative approach, the distribution of at least one population of plural wood particles within the curable wood particle composite is non-uniform. An example of a suitable approach creating such a non-uniform distribution is one in which a first reactive wood particle blend including relatively small wood particles is layered into a compression mold, followed by a second reactive wood particle blend including relatively large wood particles, followed by another layer of the first reactive wood particle blend. The cured wood particle composite formed in this way (e.g., particle board) has surfaces including tightly packed smaller particles and an interior (i.e., core) including larger particles, such that the surface is smoother and more appealing to sight and touch than would be the case if first reactive wood particle blend were uniformly distributed throughout the curable wood particle composite, and hence the cured wood particle composite. Non-uniform distributions of plural wood particles (reactive or untreated) involving gradients (continuous, discrete, or both) are also contemplated by the present invention.

Although many of the foregoing suitable approaches to making curable and cured composites have entailed placing a reactive wood blend in a mold, the method of the present invention is amenable to utilization in any of the wood particle composite forming technologies currently in use or contemplated. Processes may be batch processes, continuous processes, or some combination of batch and continuous processes. Typically, curing is accomplished at a temperature of: at least 75, at least 90, or at least 105° C.; and no more than 210, no more than 190, or no more than 165° C. The moisture content (e.g., 2 to 8 weight percent based on the combined weight of the plural wood particles) facilitates heat transfer and diffusion of ingredients with the effect often increasing with temperature within this range. The practitioner will recognize that curing may begin at temperature of 50° C. or even as low as 30° C., and that under some conditions a strong base of the present invention may be active enough to allow curing to be accomplished at temperatures of at least 30° C. to 75° C. Typical curing pressures are: at least 1.0, or at least 2.0 MPa; and no more than 100, no more than 50, no more than 10, or no more than 5 MPa.

The bonding of two of more cured wood particle composites of the present invention to one another is also within the scope of the present invention. The functional components of the present invention may be used as an adhesive to accomplish this inter-composite bonding, or any other suitable adhesive may be used. Typically, when cured wood particle composite panels of the present invention are bonded in this way, a laminar article is formed. A cured wood particle composite of the present invention may also be usefully bonded to other substrates. These other substrates include, but are not limited to: plastics, metallized plastics, fiberglass, glass, metal, native wood (i.e., not a wood particle composite), wood particle composites internally bonded using materials other than the Michael reaction mixture of the present invention, and paper, any of which may, optionally, have smooth or structured surfaces.

In the practice of the present invention, plural filler particles may also be included in the reactive wood particle blend. Illustrative examples of filler particles include, but are not limited to: silica, glass such as glass powder, glass beads, and glass fiber; virgin and recycled plastic; carbon fiber; and rubber. Additionally, such adjuvants as, for example, organic and inorganic wood preservatives, organic and inorganic pesticides, and organic and inorganic flame retardants may be incorporated into the reactive wood particle blend, and hence into the curable and cured wood particle composites of the present invention.

The curing process has been described in terms of compression molding, but the practitioner will recognize that any curing method is suitable that, during or subsequent to shaping of a reactive wood particle blend into a curable wood particle composite, provides conditions appropriate to cause the Michael ingredients to react and to induce the desired dimensions and shape into the cured wood particle composite. Although the examples contained in the experimental section are directed to a batch process, continuous processes are also contemplated by the present invention. Non-limiting examples of continuous methods for preparing and curing curable wood particle composites include reactive extrusion and calendering.

The practitioner will further recognize that the foregoing suitable approaches are indeed illustrative of the method of making and curing the curable wood particle composite of the present invention, and that many other suitable approaches are suggested by those explicitly stated approaches, and are within the scope and spirit of the present invention.

The cured wood particle composite of the present invention may be prepared in the form of a variety of articles, a non-exhaustive list of which includes: structural and non structural boards, trusses, beams and joists, cabinets and cabinetry components, furniture and furniture components, paneling, siding, shelving, moulding, flooring, underlayment, decking, countertops, sheathing, wrap, and paper.

EXPERIMENTAL EXAMPLES

Some embodiments of the invention will now be described in detail in the following Examples. The following abbreviations shown in Table B are used in the examples.

TABLE B

| Abbreviations | |
| --- | --- |
| Abbreviation | Description |
| CM | Carbon Michael |
| CWC | Curable Wood particle composite |
| MoE | Modulus of Elasticity |
| MoR | Modulus of Rupture |
| NaOH | Sodium Hydroxide |
| PRWP | Plural Reactive Wood Particles |
| TMP(AcAc)$_3$ | Trimethylolpropane tris(acetoacetate) |
| TMPTA | Trimethylolpropane tris(acrylate) |
| g | gram |
| g/cc | grams/cubic centimeter |

Molecular Weight Determination using Gel Permeation Chromatography (GPC). This GPC method is suitable for determining the molecular weight characteristics of multi-functional Michael donors and multi-functional Michael acceptors which are polymeric or Oligomeric. Gel Permeation Chromatography, otherwise known as size exclusion chromatography, actually separates the members of a distribution of polymer chains according to their hydrodynamic size in solution rather than their molar mass. The system is then calibrated with standards of known molecular weight and composition to correlate elution time with molecular weight. The techniques of GPC are discussed in detail in *Modern Size Exclusion Chromatography*, W. W. Yau, J. J Kirkland, D. D. Bly; Wiley-Interscience, 1979, and in *A Guide to Materials Characterization and Chemical Analysis*, J. P. Sibilia; VCH, 1988, p. 81-84.

For example, the molecular weight information for a low molecular weight sample (e.g., 10,000) may be determined as follows: The sample (an aqueous emulsion containing low molecular weight particles) is dissolved in THF at a concentration of approximately 0.1% weight sample per volume THF, and shaken for 6 hours, followed by filtration through a 0.45 μm PTFE (polytetrafluoroethylene) membrane filter. The analysis is performed by injecting 100 μl of the above solution onto 3 columns, connected in sequence and held at 40° C. The three columns are: one each of PL Gel 5 100, PL Gel 5 1,000, and PL Gel 5 10,000, all available from Polymer Labs, Amherst, Mass. The mobile phase used is THF flowing at 1 ml/min. Detection is via differential refractive index. The system was calibrated with narrow polystyrene standards. PMMA-equivalent molecular weights for the sample are calculated via Mark-Houwink correction using $K=14.1\times10^{-3}$ ml/g and $a=0.70$ for the polystyrene standards and $K=10.4\times10^{-3}$ ml/g and $a=0.697$ for the sample.

Characterization of plural wood particles. Plural wood particles are commercially available over a wide range wood compositions and particle size distributions (i.e., mesh sizes). In the process of the present invention, a wide range of compositional types and sizes of plural wood particles can be employed. In the following examples, three different types of plural wood particles (i.e., Type 1, Type 2, and Type 3 described below) are utilized in the formation of curable and cured wood particle composites.

Type 1 plural wood particles. These plural wood particles, made from mixed hardwoods, were obtained from Forintek Canada Corp. (319 rue Franquet, Quebec, QC, Canada G1P 4R4). These particles are typical of the wood particles used to make particleboard. The plural wood particles show a range of sizes and shapes. Upon sieving, the approximate weight percent (wt %) distribution of the Type 1 plural wood particles was: 8 wt % greater than 1400 μm, 80 wt % greater than 300 μm and equal to or less than 1400 μm, 4 wt % greater than 200 μm and equal to less than 300 μm, 3 wt % greater than 100 μm and equal to or less than 200 μm, and about 2% fines (equal to or less than 100 μm). Microscopic image analysis revealed the average aspect ratio of the particles to be within the range 2 to 3 and the mean diameter to be within the range 700 to 1500 microns. The term "mean diameter" applies to the face of the particle comprised of the longest axis (length) and the 2nd longest axis (width in most cases). Most of the particles are plate-like; thus, the third dimension (thickness) is likely to be the smallest and differ substantially from the width. The water content of the wood chips was measured by heating them to constant weight at 105° C. The water content ranged from 4 to 6%.

Microscopic image analysis consisted of spreading out the wood particles on a Microtek 8700 flatbed scanner over approximately a five centimeter square area. The particles were separated with a probe so that most of the particles larger than fines were isolated and not touching each other. Gray-scale scans were taken at 1200 dpi. Image-Pro Plus image analysis software from Media Cybernetics was used to find the particle measurements. A 3×3 pixel median filter was applied to reduce noise in the image before thresholding to select the particles. An automatic count/size routine was run to find the particle measurements. The key measurements found were aspect ratio and mean diameter. The Image-Pro Plus manual describes the aspect ratio as the ratio "between the major axis and the minor axis of the ellipse equivalent to the object (i.e., an ellipse with the same area, first and second degree moments)". The definition of the mean diameter is "the average length of the diameters measured at two degree intervals joining two outline points and passing through the centroid."

Type 2 plural wood particles. These plural wood particles (product code AWF2037), made from mixed hardwoods, were obtained from American Wood Fibers (100 Alderson Street, Schofield, Wis. 54476). The plural wood particles show a range of sizes and shapes. Upon sieving, the approximate weight percent (wt %) distribution of the Type 2 plural wood particles was: 10 wt % greater than 850 μm, 60 wt % greater than 425 μm and equal to or less than 850 μm, 20 wt % greater than 250 μm and equal to less than 425 μm, and about 10 wt % fines (equal to or less than 75 μm). The water content of the wood chips was measured by heating them to constant weight at 105° C. The water content ranged from 4 to 8%.

Type 3 plural wood particles. These plural wood particles made from mixed hardwoods, were obtained from Forintek Canada Corp. These particles are typical of the wood strands used to make oriented strandboard ("OSB"). The plural wood particles show a range of sizes and shapes. Microscopic image analysis revealed the average aspect ratio of the particles to be within the range 4 to 5 and the mean diameter to be within the range 1500 to 2500 microns. The water content of the wood chips was measured by heating them to constant weight at 105° C. The water content ranged from 4 to 6%.

Test Methods for Cured Wood particle composites. Determination of Density: The thickness of each cured wood particle composite panel was measured twice on each of its four sides to the nearest 0.01 mm using a caliper. Each panel was weighed to the nearest 0.01 gram on a laboratory balance. Density was calculated from the volume and weight of the panel. Additionally, three 3.81 cm×3.81 cm pieces were cut from each panel. The thickness of each of these 3.81 cm×3.81 cm pieces was measured once on each of its four sides to the nearest 0.01 mm using a caliper. Each 3.81 cm×3.81 cm piece was weighed to the nearest 0.01 gram on a laboratory balance. The density is targeted by adjusting the weight of materials used and the thickness of the panel. Most experimental preparations targeted panel density at 0.75 g/cc.

Determination of Water Resistance. A water soak test (as described in ASTM D 1037-99 section 100-107, Method B) was used to determine the water resistance of each cured wood particle composite panel. Three 3.81 cm×3.81 cm test specimens were cut from the panel with a band saw. The weight of each test specimen was measured to the nearest 0.01 g, and the thickness was measured to 0.01 mm. The average of 4 thickness measurements was used. The test specimens were placed in a trough with deionized (DI) water and covered with a screen box so that they were submerged. The test specimens were re-weighed and their thicknesses were re-measured after 24 hours of soaking. The "thickness swelling" was measured by dividing the average thickness of a test specimen after swelling by its average thickness before swelling, then subtracting 1 and multiplying by 100%. Values of thickness swelling up to 100% are rated "good"; values below 50% are rated "excellent"; and values below 10% are rated "exceptional".

Determination of Flexibility: Measurement of Modulus of Elasticity ("MoE") and Modulus of Rupture ("MoR"), as described in ASTM D 1037-99 section 11-20 (MoE), were made on a Tinius Olsen tensile tester fitted with the 3 point bend apparatus specified in ASTM D 1037, using a span of 10.16 cm with a crosshead speed of 0.635 cm/min. At least 2 replicates were run for each sample and the average in MPa was recorded. For MoE, values above 1,034 MPa (150,000 psi) are rated "good", values above 1,724 MPa (250,000 psi) are rated "excellent" and values above 2,413 MPa (350,000 psi) are rated "exceptional". For MoR, values above 4.14 MPa (600 psi) are rated good; values above 6.89 MPa (1,000 psi) are rated excellent; and values above 10.34 MPa (1500 psi) are rated exceptional.

Example 1

Preparation of First Plural Reactive Wood Particles (PRWP)

2.6 g of TMP(AcAc)$_3$ and 3.8 g of TMPTA is premixed and then added to 107.4 g of plural wood particles designated as Type 1 above and shaken for about one minute. The total mixture is placed on a jar roller (US Stoneware Jar Mill Model 755) for about 15 minutes at about 75% of maximum speed in a 1.92 liter glass jar to form first plural reactive wood particle material.

Preparation of second plural reactive wood particles. 51.6 g of 25 wt % aqueous NaOH is added to 107.4 g of plural wood particles designated as Type 1 above and shaken for about one minute. The total mixture is placed on a jar roller (US Stoneware Jar Mill Model 755) for about 15 minutes at about 75% of maximum speed in a 1.92 liter glass jar to form second plural reactive wood particle material.

Preparation of reactive wood particle blend and cured wood particle composite. In a separate container, 53.7 g of the first PRWP and 53.7 g of the second PRWP are blended and placed on the jar roller (see above) for 15 minutes to form the reactive wood particle blend (which, in this case, is also the curable wood particle composite). The cured wood particle composite is prepared in a mold that consists of an aluminum block with a 15.24 cm×15.24 cm cut out (i.e., an opening extend all the way through the block. Another 15.24 cm×15.24 cm aluminum block having dimensions matching the 15.24 cm×15.24 cm of the opening in the first block and having a thickness that is 0.64 cm less than the thickness of the first block is placed on top of the cut-out block to shape the curable wood particle composite. The first block is placed on a chromed stainless steel plate having dimensions 38 cm×38 cm×0.10 cm, which is itself resting on a stainless steel plate having dimensions 38 cm×38 cm×0.64 cm. The reactive wood particle blend is placed within the opening of the first block and leveled with a plastic leveling blade. The second block is placed over the opening in the first block and a second stainless steel plate having dimensions 38 cm×38 cm×0.64 cm is placed on top. The assemblage of plates and blocks containing the curable wood particle composite is then placed between the platens of a press (from Reliable Rubber and Plastics Machine Company) and pressed at about 2.76 MPa (400 psi) with a platen temperature of about 160° C. for a period of 8 minutes. (Note: it takes about 3 minutes for the curable wood particle composite to reach a temperature of 140° C. Times indicated in these examples are the total times, including the heat up time). The materials are then cooled at 2.76 MPa (400 psi) to about 50° C. Then the cured wood particle composite, in the form of a panel, is released from the mold. The resultant cured wood particle composite panel is a hard piece having dimensions of 15.24 cm×15.24 cm×0.64 cm.

Testing of Panel—The cured wood particle composite panel is cut with a band saw so that at least 2 pieces having dimensions 15.24 cm×2.54 cm×0.64 cm and at least 3 pieces having dimensions 3.81 cm×3.81 cm×0.64 cm are obtained. Using the test methods described above, the following values should be observed:

| | |
|---|---|
| Density | 0.78 g/cc |
| MoE | 2000 MPa |
| MoR | 850 MPa |
| % Thickness Swell | 35% |

Examples 2-19

Preparation and Use of Additional Plural Reactive Wood Particles

Functional components containing either one or two Carbon-Michael ingredients, as indicated in Table 1, are added to plural wood particles of the type designated in Table 1 and shaken for about one minute. The total mixture is placed on a jar roller (US Stoneware Jar Mill Model 755) for about 15 minutes at about 75% of maximum speed in a 1.92 liter glass jar.

TABLE 1

Plural reactive wood particles formed from plural wood particles and either one or two Carbon-Michael ingredients.

| | | | Functional Component | | |
|---|---|---|---|---|---|
| Plural reactive wood particles (PRWP) | Plural wood Particles, Type | Plural wood Particles, grams | Weight TMP(AcAc)$_3$, grams | Weight TMPTA, grams | 25 Wt % Aq Solution NaOH, grams |
| 3 | 1 | 107.4 | 3.9 | | |
| 4 | 1 | 107.4 | | 5.7 | |
| 5 | 1 | 107.4 | | | 77.4 |
| 6 | 1 | 107.4 | 3.9 | 5.7 | |
| 7 | 1 | 107.4 | | 5.7 | 77.4 |
| 8 | 1 | 107.4 | 3.9 | | 77.4 |

TABLE 1-continued

Plural reactive wood particles formed from plural wood particles and either one or two Carbon-Michael ingredients.

| Plural reactive wood particles (PRWP) | Plural wood Particles, Type | Plural wood Particles, grams | Weight TMP(AcAc)$_3$, grams | Weight TMPTA, grams | 25 Wt % Aq Solution NaOH, grams |
|---|---|---|---|---|---|
| 9 | 1 | 107.4 | 3.9 | 5.7 | 77.4 |
| 10 | 2 | 107.4 | 3.9 | | |
| 11 | 2 | 107.4 | | 5.7 | |
| 12 | 2 | 107.4 | | | 77.4 |
| 13 | 2 | 107.4 | 3.9 | 5.7 | |
| 14 | 2 | 107.4 | | 5.7 | 77.4 |
| 15 | 2 | 107.4 | 3.9 | | 77.4 |
| 16 | 2 | 107.4 | 3.9 | 5.7 | 77.4 |
| 17 | 3 | 107.4 | 3.9 | | |
| 18 | 3 | 107.4 | | 5.7 | |
| 19 | 3 | 107.4 | | | 77.4 |
| 20 | 3 | 107.4 | 3.9 | 5.7 | |
| 21 | 3 | 107.4 | 3.9 | 5.7 | 77.4 |
| 22 | 3 | 107.4 | 3.9 | | 77.4 |
| 23 | 3 | 107.4 | 3.9 | 5.7 | 77.4 |

Preparation of curable wood particle composite and curing to form cured wood particle composite. In a separate container, amounts of the plural reactive wood particles ("PRWP")s as indicated in Table 2 are blended and placed on the jar roller for another 15 minutes. The reactive wood particle blends thus formed are used to prepare cured wood particle composites as described in Example 1. The characteristics of that should be observed for the cured wood particle composite panels are indicated in Table 2.

TABLE 2

Characteristics of cured wood particle composites when prepared from reactive wood particle blends formed from two or more populations of plural reactive wood particles.

| Example Number | Weights (g) of plural reactive wood particles in each blend | Density (g/cc) | MoE (MPa) | MoR (MPa) | Thickness Swell (%) |
|---|---|---|---|---|---|
| 2 | 35.8 g of PRWP 3<br>35.8 g of PRWP 4<br>35.8 g of PRWP 5 | 0.750 | 2000 | 6.50 | 30 |
| 3 | 35.8 g of PRWP 6<br>35.8 g of PRWP 5<br>35.8 g Type 1 Plural Wood Particles | 0.750 | 2000 | 6.50 | 30 |
| 4 | 35.8 g of PRWP 7<br>35.8 g of PRWP 3<br>35.8 g Type 1 Plural Wood Particles | 0.750 | 2000 | 6.50 | 30 |
| 5 | 35.8 g of PRWP 8<br>35.8 g of PRWP 4<br>35.8 g Type 1 Plural Wood Particles | 0.750 | 2000 | 6.50 | 30 |
| 6 | 35.8 g of PRWP 10<br>35.8 g of PRWP 11<br>35.8 g of PRWP 12 | 0.750 | 2000 | 6.50 | 30 |
| 7 | 35.8 g of PRWP 13<br>35.8 g of PRWP 12<br>35.8 g Type 2 Plural Wood Particles | 0.750 | 2000 | 6.50 | 30 |
| 8 | 35.8 g of PRWP 14<br>35.8 g of PRWP 10<br>35.8 g Type 2 Plural Wood Particles | 0.750 | 2000 | 6.50 | 30 |
| 9 | 35.8 g of PRWP 15<br>35.8 g of PRWP 11<br>35.8 g Type 2 Plural Wood Particles | 0.750 | 2000 | 6.50 | 30 |
| 10 | 35.8 g of PRWP 17<br>35.8 g of PRWP 18<br>35.8 g of PRWP 19 | 0.750 | 2000 | 6.50 | 30 |
| 11 | 35.8 g of PRWP 20<br>35.8 g of PRWP 19<br>35.8 g Type 3 Plural Wood Particles | 0.750 | 2000 | 6.50 | 30 |
| 12 | 35.8 g of PRWP 21<br>35.8 g of PRWP 17<br>35.8 g Type 3 Plural Wood Particles | 0.750 | 2000 | 6.50 | 30 |
| 13 | 35.8 g of PRWP 22<br>35.8 g of PRWP 18<br>35.8 g Type 3 Plural Wood Particles | 0.750 | 2000 | 6.50 | 30 |
| 14 | 35.8 g of PRWP 3<br>35.8 g of PRWP 5<br>35.8 g of PRWP 11 | 0.75 | 2200 | 8.5 | 25 |

TABLE 2-continued

Characteristics of cured wood particle composites when prepared from reactive wood particle blends formed from two or more populations of plural reactive wood particles.

| Example Number | Weights (g) of plural reactive wood particles in each blend | Cured Wood particle composite | | | |
|---|---|---|---|---|---|
| | | Density (g/cc) | MoE (MPa) | MoR (MPa) | Thickness Swell (%) |
| 15 | 35.8 g of PRWP 4<br>35.8 g of PRWP 10<br>35.8 g of PRWP 12 | 0.75 | 2400 | 10.0 | 25 |
| 16 | 35.8 g of PRWP 6<br>35.8 g of PRWP 12<br>35.8 g Type 1 Plural Wood Particles | 0.75 | 2200 | 8.5 | 25 |
| 17 | 35.8 g of PRWP 6<br>35.8 g of PRWP 12<br>35.8 g Type 2 Plural Wood Particles | 0.75 | 2400 | 10.0 | 25 |
| 18 | 35.8 g of PRWP 5<br>35.8 g of PRWP 13<br>35.8 g Type 1 Plural Wood Particles | 0.75 | 2200 | 8.5 | 25 |
| 19 | 35.8 g of PRWP 5<br>35.8 g of PRWP 13<br>35.8 g Type 2 Plural Wood Particles | 0.75 | 2400 | 10.0 | 25 |
| Comparative 1 | 35.8 g of PRWP 3<br>35.8 g of PRWP 4<br>35.8 g Type 1 Plural Wood Particles | 0.750 | 700 | 3.50 | 85 |
| Comparative 2 | 35.8 g of PRWP 6<br>71.6 g Type 1 Plural Wood Particles | 0.750 | 700 | 3.50 | 85 |
| Comparative 3 | 35.8 g of PRWP 7<br>71.6 g Type 1 Plural Wood Particles | 0.750 | 950 | 4.00 | 50 |
| Comparative 4 | 35.8 g of PRWP 8<br>71.6 g Type 1 Plural Wood Particles | 0.750 | (a) | (a) | (a) |
| Comparative 5 | 35.8 g of PRWP 9<br>71.6 g Type 1 Plural Wood Particles | 0.750 | (a) | (a) | (a) |
| Comparative 6 | 35.8 g of PRWP 16<br>71.6 g Type 2 Plural Wood Particles | 0.750 | (a) | (a) | (a) |
| Comparative 7 | 35.8 g of PRWP 23<br>71.6 g Type 3 Plural Wood Particles | 0.750 | (a) | (a) | (a) |

(a) Panel is too weak to measure properties

Examples 2 through 13 illustrate that blending of populations of plural reactive wood particles made with different Carbon-Michael ingredients would be expected to produce cured wood particle composite panels with good properties provided that at least one Carbon-Michael ingredient from each of multi-functional Michael donor, multi-functional Michael acceptor, and strong base catalyst is present and all three ingredients are not present in one particular PRWP. These examples also illustrate that blending PRWP's with plural wood particles that do not contain functional components would not be expected to harm the resultant properties of the cured wood particle composite panels.

Examples 14 through 19 illustrate that two populations of plural reactive wood particles, made from different particle size wood, can be blended to form a reactive wood particle blend that would be expected to enhance the strength of resultant cured wood particle composite panels.

Comparative examples 1 through 4 illustrate that when at least one member of the group of functional Carbon-Michael ingredients, multi-functional Michael donor, multi-functional Michael acceptor, and strong base catalyst is not present, the resultant cured wood particle composite panels would be expected to display poor properties.

Comparative examples 5 through 7 illustrate that when all three members of the group of functional Carbon-Michael ingredients, multi-functional Michael donor, multi-functional Michael acceptor, and strong base catalyst (i.e., all three types of Michael ingredient) are present in a single functional component, the resultant cured wood particle composite panels are expected to display poor properties because of pre-curing of the components.

We claim:

1. A method of comprising the steps of:
    (a) providing at least one population of plural untreated wood particles;
    (b) providing at least two Michael functional components;
    (c) contacting a population of the plural untreated wood particles with the at least two Michael functional components to form a population of plural Michael reactive wood particles;
    (d) blending any remaining plural untreated wood particles and any of the population of plural Michael reactive wood particles to form a reactive wood particle blend; and
    (e) shaping the reactive wood particle blend to form a curable wood particle composite,
    wherein:
        the step of contacting occurs: before the step of blending; during the step of blending; or both before and during the step of blending;
        each Michael functional component comprises one or two types of Michael ingredient selected from:
            (i) a multi-functional Michael donor;
            (ii) a multi-functional Michael acceptor; and
            (iii) a strong base catalyst having a conjugate acid which has a $pK_a$ of greater than 12.5; and
        the Michael functional components, taken together, comprise:

at least one of the multi-functional Michael donor;
at least one of the multi-functional Michael acceptor; and
at least one of the strong base catalyst.

2. The method of claim 1, further comprising a step of curing the curable wood particle composite to form a cured wood particle composite, wherein the curing comprises reacting the multi-functional Michael donor with the multi-functional Michael acceptor.

3. The method of claim 1, wherein at least one of the Michael functional components comprises the strong base catalyst absent the multi-functional Michael acceptor.

4. The method of claim 1, wherein at least one of the multi-functional donor and the multi-functional acceptor has a weight average molecular weight of no more than 2,000 g/mole.

5. The method of claim 1, wherein:
the multi-functional donor has a weight average molecular weight of no more than 2,000 g/mole; and
the multi-functional acceptor has a weight average molecular weight of no more than 2,000 g/mole.

6. The method of claim 1 wherein at least one multi-functional Michael donor has a Michael donor functionality of 3 or greater, or at least one multi-functional Michael acceptor has a Michael acceptor functionality of 3 or greater.

7. The method of claim 1, wherein:
the multi-functional Michael donor is a compound having:
at least on Michael donor functional group, the Michael donor functional group containing at least one Michael active hydrogen atom which is a hydrogen atom attached to a carbon atom that is located between two electron-withdrawing groups; and
a Michael donor functionality of at least 2; and
the multi-functional Michael acceptor is a compound having:
two or more Michael acceptor functional groups having the structure

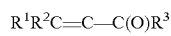

wherein:
$R^1$, $R^2$, and $R^3$ are, independently, selected from hydrogen and an organic radical;
the organic radical is selected from: linear alkyl, branched alkyl, cyclic alkyl, aryl, alkaryl, and derivatives and substituted versions thereof; and
$R^1$, $R^2$, and $R^3$, independently, optionally contain: ether linkages, carboxyl groups, carbonyl groups, and thio analogs thereof; nitrogen containing groups; or combinations thereof.

8. The method of claim 1, comprising at least two populations of plural untreated wood particles differing in particle size such that there exists a sieve opening size through which at least 60 weight percent of one of those populations of plural untreated wood particles passes and at least 60 weight percent of the other population of plural wood particles does not pass.

9. A curable wood particle composite comprising:
(a) at least one population of plural Michael reactive wood particles; and
(b) at least two Michael functional components,
wherein:
each Michael functional component comprises one or two types of Michael ingredient selected from:
(i) a multi-functional Michael donor;
(ii) a multi-functional Michael acceptor; and
(iii) a strong base catalyst having a conjugate acid which has a $pK_a$ of greater than 12.5; and
the Michael functional components, taken together, comprise:
at least one of the multi-functional Michael donor;
at least one of the multi-functional Michael acceptor; and
at least one of the strong base catalyst.

10. The method of claim 2, wherein the curing is at a pressure of 1 to 50 Megapascals.

11. The method of claim 2, wherein the cured wood composite has a Modulus of Elasticity according to ASTM D 1037-99 section 11-20 of greater than 1,034 Megapascals, a Modulus of Rupture according to ASTM D 1037-99 section 11-20 of greater than 4.14 Megapascals, and a thickness swell according to ASTM D 1037-99 section 100-107, Method B of less than or equal to 100%.

12. The method of claim 1, comprising
(a) providing at least a first and a second population of plural untreated wood particles;
(b) providing at least a first and a second Michael functional components, wherein the first Michael functional component comprises a first multi-functional Michael donor and a first multi-functional Michael acceptor, and the second Michael functional component comprises a strong base in the absence of any multi-functional Michael donor or any multi-functional Michael acceptor;
(c) contacting the first population of the plural untreated wood particles with the first Michael functional components to form a first population of plural Michael reactive wood particles;
(d) contacting the second population of the plural untreated wood particles with the second Michael functional component to form a second population of plural treated wood particles;
(e) blending the first population of plural Michael reactive wood particles with the second population of plural treated wood particles to form a reactive wood particle blend; and
(f) shaping the reactive wood particle blend to form a curable wood particle composite.

* * * * *